(12) United States Patent
Guinehut

(10) Patent No.: US 7,240,932 B2
(45) Date of Patent: Jul. 10, 2007

(54) ENERGY-ABSORBING CASE FOR A MOTOR VEHICLE BUMPER BEAM

(75) Inventor: Sebastien Guinehut, Pars (FR)

(73) Assignee: Valeo Systems Thermiques, Le Mesnil St Denis (FR)

( * ) Notice: Subject to any disclaimer, the term of this patent is extended or adjusted under 35 U.S.C. 154(b) by 0 days.

(21) Appl. No.: 10/540,796

(22) PCT Filed: Dec. 23, 2003

(86) PCT No.: PCT/FR03/03882
§ 371 (c)(1),
(2), (4) Date: Jun. 27, 2005

(87) PCT Pub. No.: WO2004/060724
PCT Pub. Date: Jul. 22, 2004

(65) Prior Publication Data
US 2006/0071488 A1   Apr. 6, 2006

(30) Foreign Application Priority Data
Dec. 30, 2002   (FR) .................. 02 16855

(51) Int. Cl.
B60R 19/02 (2006.01)
(52) U.S. Cl. ...................................... 293/132
(58) Field of Classification Search ................ 293/133, 293/132, 102, 120, 122
See application file for complete search history.

(56) References Cited

U.S. PATENT DOCUMENTS 3,888,502 A * 6/1975 Felzer et al. ................. 280/784
2002/0066254 A1 * 6/2002 Ebbinghaus ................ 52/735.1

* cited by examiner

Primary Examiner—H Gutman
(74) Attorney, Agent, or Firm—Ronald Courtney

(57) ABSTRACT

The energy-absorbing case (2) comprises a casing consisting of a hollow section piece which has a first end attached to the bumper beam (2) and a second end able to be fixed to the end of a longitudinal longeron (6) of the motor vehicle. The casing is filled with a metal foam with energy-absorption properties, the density of which is between 0.1 g/cm³ and 0.4 g/cm³. Application to motor vehicles.

12 Claims, 5 Drawing Sheets

ENERGY-ABSORBING CASE FOR A MOTOR VEHICLE BUMPER BEAM

The invention relates to an energy-absorbing case intended to be placed between the end of a longeron of a motor vehicle and a bumper beam.

It relates more specifically to an energy-absorbing case for a motor vehicle bumper beam comprising a casing consisting of a hollow section piece which has a first end able to be attached to the bumper beam and a second end able to be fixed to the end of a motor vehicle longeron.

BACKGROUND OF THE INVENTION

Current vehicles have a front end able to incorporate various vehicle equipment items such as the headlamps, the turn indicators, the horn, etc. The front end is a modular element ready to be mounted on the vehicle. It is mounted by connection to lateral structural elements of the vehicle, such as the longerons, then by fitting an added-on bumper to the module. Energy-absorbing cases are arranged between each of the longerons and the bumper beam. These absorbing cases need to satisfy strict standards so as to be able to absorb the energy of a standardized impact known by the name of Danner impact corresponding to the vehicle striking a stationary obstacle at a speed of 16 km/h. The energy is to be absorbed without the force spike sustained by the case exceeding a maximum limit of 120 kN for example.

Furthermore, the cost of insuring a motor vehicle is calculated on the basis of the cost of the repairs to be made to the vehicle after a frontal impact at 16 km/hour. The higher the repair cost, the higher the insurance premium will be. It is therefore important, in order to limit this premium for a given vehicle, for the vehicle to be capable of undergoing such a frontal impact without sustaining a great deal of damage.

Finally, modern vehicles are becoming increasingly compact and this introduces new constraints on the production of the energy-absorbing cases which have to absorb the same amount of energy in an increasingly small volume.

BRIEF SUMMARY OF THE INVENTION

It is precisely an object of the present invention to respond to these various difficulties. The object of the invention is to maximize the ratios of energy absorbed with respect to the mass of the energy absorber (the energy-mass ratio) and the energy absorbed with respect to the intrusion of the object which strikes the vehicle or that the vehicle strikes (energy-intrusion ratio). Maximizing these ratios makes it possible to reduce the damage suffered by a front end of a vehicle in a frontal impact and therefore the repair cost and the insurance premium.

These objects are achieved, according to the invention, through the fact that the casing is filled with a metal foam with energy-absorption properties, the density of which is between 0.1 g/cm$^3$ and 0.4 g/cm$^3$.

By virtue of the interaction of the foam and the deformation of the casing, the energy absorbed by a small-volume energy-absorbing case is maximized. This results in a reduction in the size of the vehicle. Furthermore, the foam makes it possible to reduce the thickness of the casing and therefore the mass of the absorbing case, together with the overhang of the vehicle.

In an advantageous embodiment, the cross section of the casing is rectangular, particularly square. In another embodiment, the cross section of the casing is circular. The case may be made of aluminum or of steel.

When the cross section of the case is square, the side of this square is advantageously between 50 and 80 mm long, which corresponds to a cross-sectional area of between 2500 mm$^2$ and 6400 mm$^2$.

The length of the case is advantageously between 80 mm and 200 mm and its thickness between 1.5 mm and 3 mm.

Other characteristics and advantages of the invention will become further apparent from reading the description which follows of some exemplary embodiments given by way of illustration with reference to the attached figures. In these figures:

BRIEF DESCRIPTIONS OF THE INVENTION

Figure 1:
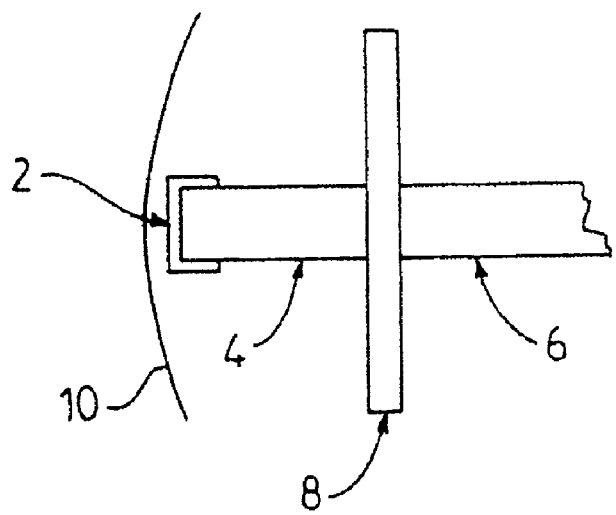
FIG. 1 is an overall view of a bumper beam and of an energy-absorbing case mounted on a front end of a motor vehicle.

FIG. 1 schematically depicts a bumper beam 2 consisting of a hollow piece section, for example of open section (C-section or U-section) or alternatively of closed section, in which an energy-absorbing case 4 is at least partially housed. This case 4 is fixed to the structure of a motor vehicle, in this instance to the end of a lower longeron 6 to which a front end module 8 is also fixed. The bumper beam is intended to accept a bumper 10, also known as the front filler panel.

Figure 2:
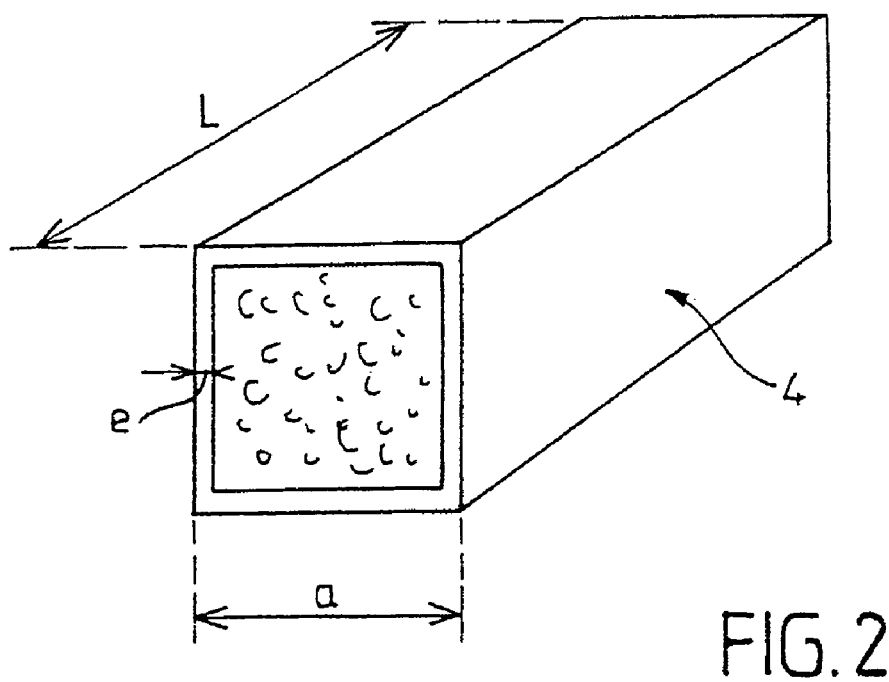
FIG. 2 is a perspective view of an energy-absorbing case according to the present invention.

FIG. 2 depicts a perspective schematic view of the energy-absorbing case 4 of FIG. 1. In the example depicted, the case 4 has a square cross section, but this cross section could equally be rectangular or circular. The case 4 has a length L and the side of its cross section has been denoted by the letter a. The casing of the case, for example made of aluminum, has a thickness e. The inside of the case is filled with a foam 12 having energy-absorption properties. The alloy used to produce the case 4 is preferably an aluminum from the 6000 series (6060, 6106 and 6082). Various heat treatments are possible, particularly those known by the designations T4, T5, T51 or T6 depending on the standards in force. The case may equally be made of steel.

An energy-absorbing case with a thickness of 2.9 mm and a length L of 130 mm was made out of aluminum. The weight of this case was 460 grams. The case incorporating the towing eye had a mass of 540 grams. An absorbing case with a thickness of 1.8 mm and a length L of between 100 and 120 mm was also made out of steel. The weight of this case was 0.8 kg and 1.12 kg for the case incorporating the towing eye.

EXAMPLE 1

An energy-absorbing case with a square cross section of 2500 mm$^2$ (sides 50 mm long) was produced. The density of the foam was between 0.2 and 0.4 g/cm$^3$. Under these conditions, for a length L less than or equal to 80 mm and a case thickness e of between 2.2 mm and 3 mm, the energy-mass ratio was below or equal to 40 and the energy-intrusion ratio was below or equal to 120.

Figure 3:
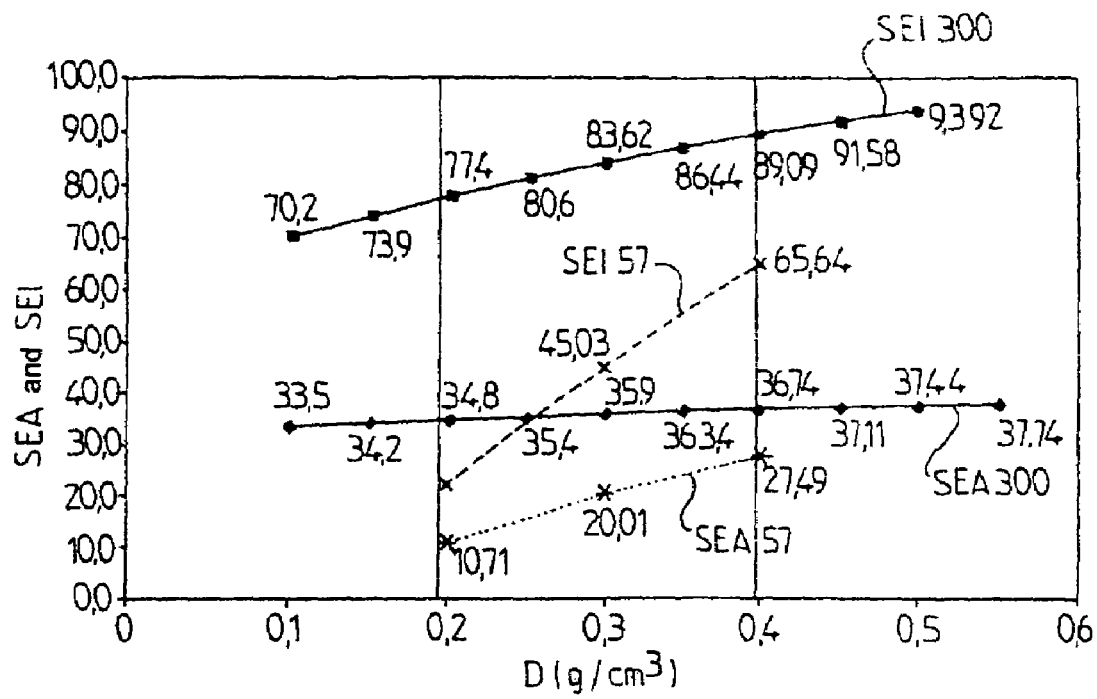
FIGS. 3 to 8 are curves depicting the variations in energy with respect to mass and energy with respect to intrusion as a function of the density of the foam for various values of case parameters.

FIG. 3 depicts the variations in energy-mass (SEA) and energy-intrusion (SEI) ratios for two given aluminum alloys from the 6000 series, namely the alloy 6060, corresponding to the curves SEA 57 and SEI 57 and the alloy 6082 corresponding to the curves SEA 300 and SEI 300, respectively. The variations were expressed as a function of the density D in g/cm³ of the metal foam. As can be seen, for the 6000 alloy, the energy-mass ratio was more or less between 10.71 and 27.49 and the energy-intrusion ratio was more or less between 22.48 and 65.64. For the 6082 alloy, the energy-mass ratio was between more or less 34.5 and 36.7 while the energy-intrusion ratio was more or less between 77 and 89.

For a case length L of between 80 and 140 mm and a thickness e of between 1.5 mm and 2.3 mm, the energy-mass ratio was between 20 and 40 and/or the energy-intrusion ratio was between 75 and 120. Optimized performance was obtained for a density D of between 0.2 and 0.4 g/cm³.

Figure 4:
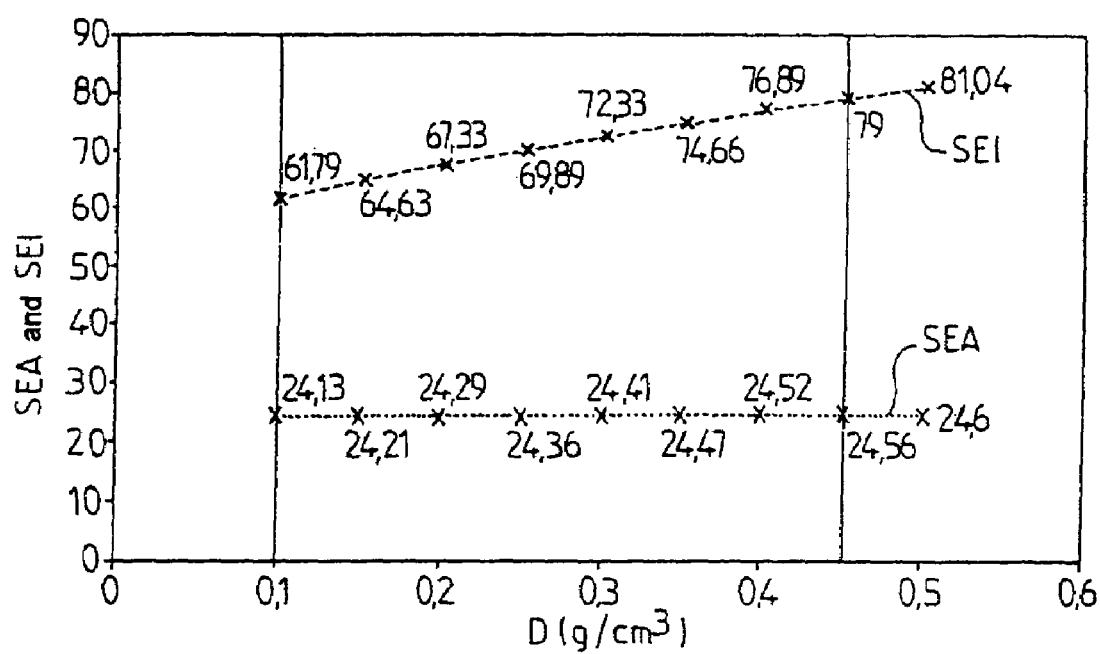

FIG. 4 depicts the variations in these two ratios for a foam density of between 0.1 and 0.5 g/cm³, for a square absorber with a side length of 50 mm, 140 mm long. The energy-mass ratio was between more or less 24.13 and 24.56, while the energy-intrusion ratio was more or less between 61.79 and 79.

For an energy-absorbing case with a length L of between 140 mm and 200 mm and a thickness e of between 1.5 mm and 2.3 mm, the energy absorption-mass ratio was between 10 and 20 and/or the energy-intrusion ratio was between 45 and 75.

Figure 5:
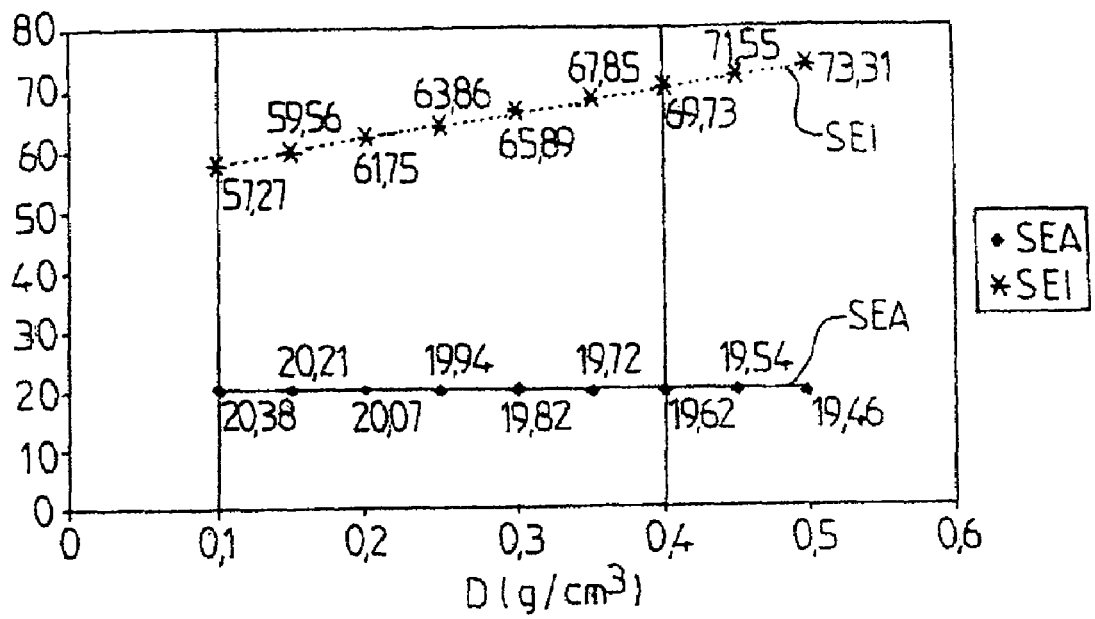

FIG. 5 depicts the variations of these two ratios for a case of square cross section with a side length of 50 mm, and a length L of 200 mm for a foam density of between 0.1 and 0.4 g/cm³. The energy-mass ratio was between 20.38 and 19.62, while the energy-intrusion ratio was between 57.27 and 69.73.

EXAMPLE 2

Several energy-absorbing cases of square cross section with a surface area of between 2500 mm² and 6400 mm² were produced, this corresponding to a square with a side length of between 50 mm and 80 mm, the density of the foam varying between 0.2 g/cm³ and 0.4 g/cm³.

For a case with a length L less than or equal to 80 mm and a thickness e of between 2.2 mm and 3 mm, the absorption-mass ratio was below or equal to 25 and/or the energy-intrusion ratio was below or equal to 105.

Figure 6:
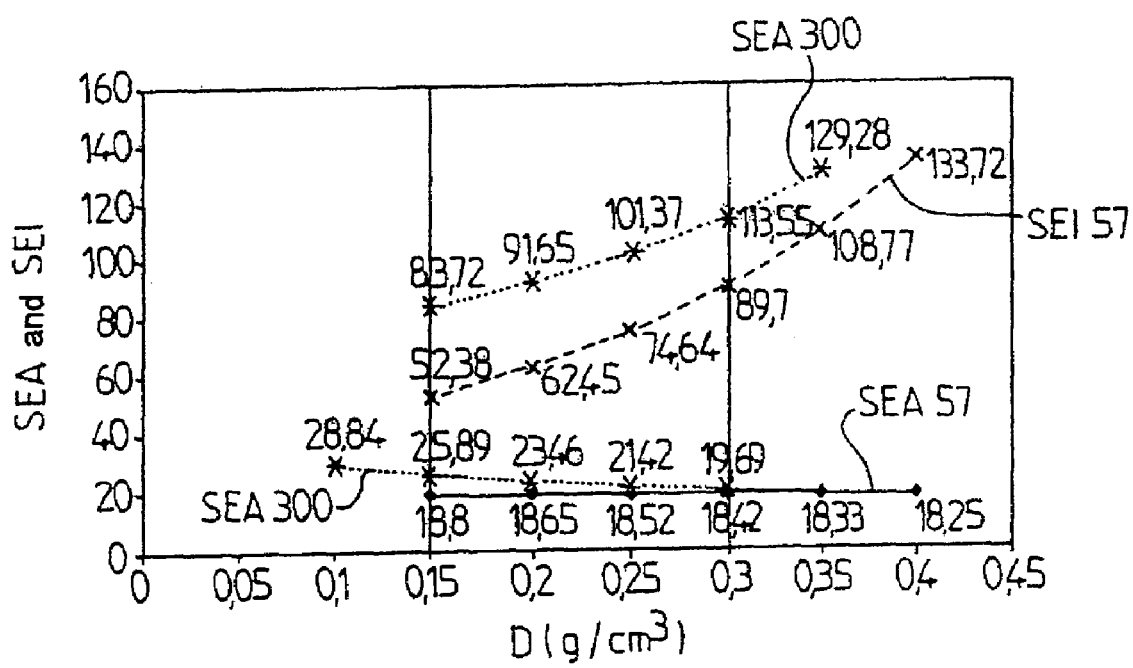

FIG. 6 depicts the variations in these two ratios for two aluminum alloys, namely the alloy 6060 corresponding to curves SEA 57 and SEI 57 and the alloy 6082 corresponding to curves SEA 300 and SEI 300 for foam densities of between 0.15 and 3 grams per cm³. For the alloy from the 6060 series, the energy-absorption ratio was between 18.8 and 18.42, while the energy-intrusion ratio was between 52.38 and 89.7. For the alloy of the 6082 series, the energy-absorption ratio SEA 300 was between 25.89 and 18.62, while the energy-intrusion ratio SEI 300 was between 83.72 and 113.55.

For a case with a length L of between 80 mm and 140 mm and a thickness e of between 1.5 mm and 2.3 mm, the energy-absorption ratio was between 12 and 25 and/or the energy-intrusion ratio was between 65 and 105.

Figure 7:
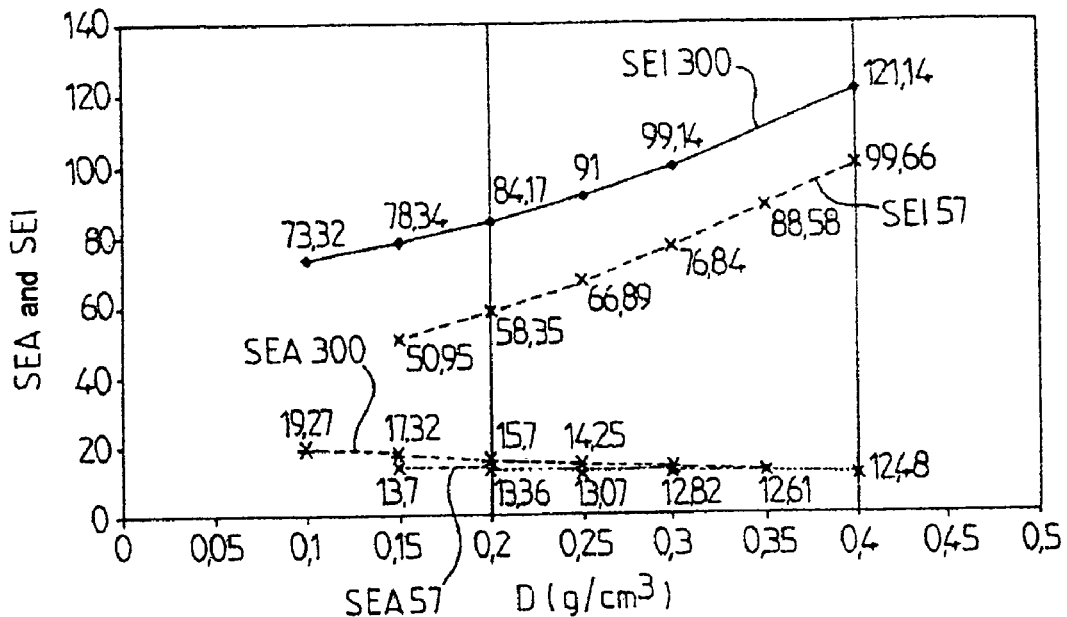

FIG. 7 depicts variations in these two ratios for two aluminum alloys, namely the alloy 6060 corresponding to curves SEA 57 and SEI 57 and the alloy 6082 corresponding to curves SEA 300 and SEI 300, respectively. For the alloy of the 6060 series, the energy-absorption ratio was between 13.36 and 12.48, while the energy-intrusion ratio was between 58.35 and 99.66. For the alloy of the 6082 series, the energy-mass ratio was between 15.7 and 14.38 while the energy-intrusion ratio was between 84.17 and 121.14, for densities of between 0.2 g/cm³ and 0.4 g/cm³.

For a case with a length L of between 140 mm and 200 mm and a thickness e of between 1.5 mm and 2.3 mm, the energy-mass ratio was between 10 and 15 and/or the energy-intrusion ratio was between 55 and 85 for an absorbent metal foam density of between 0.15 g/cm³ and 0.35 g/cm³.

Figure 8:
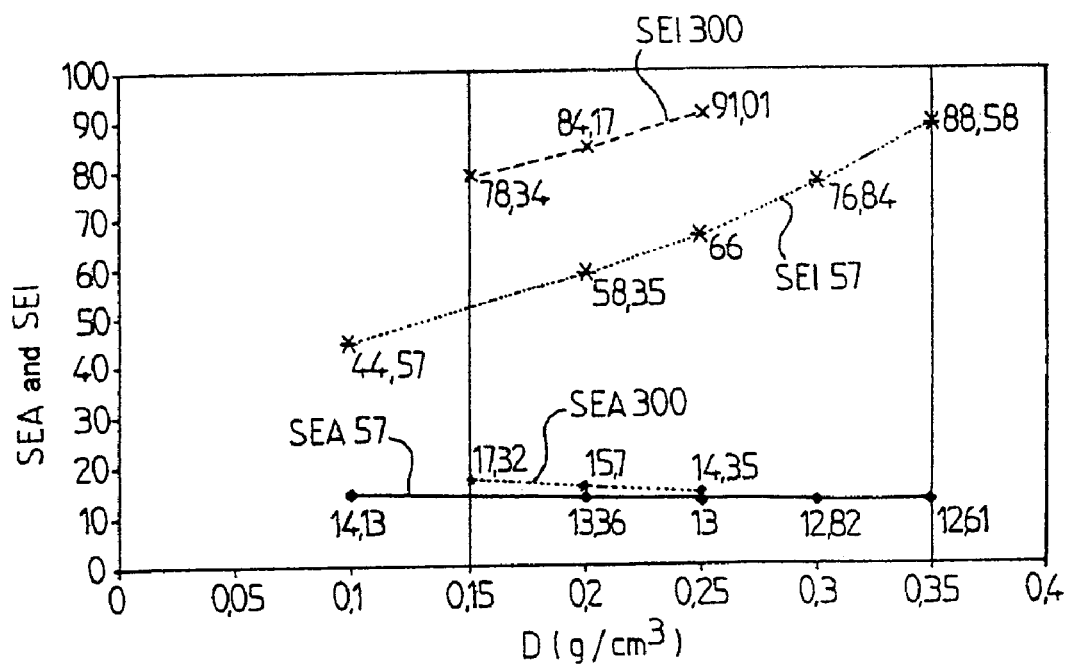
Figure 9:
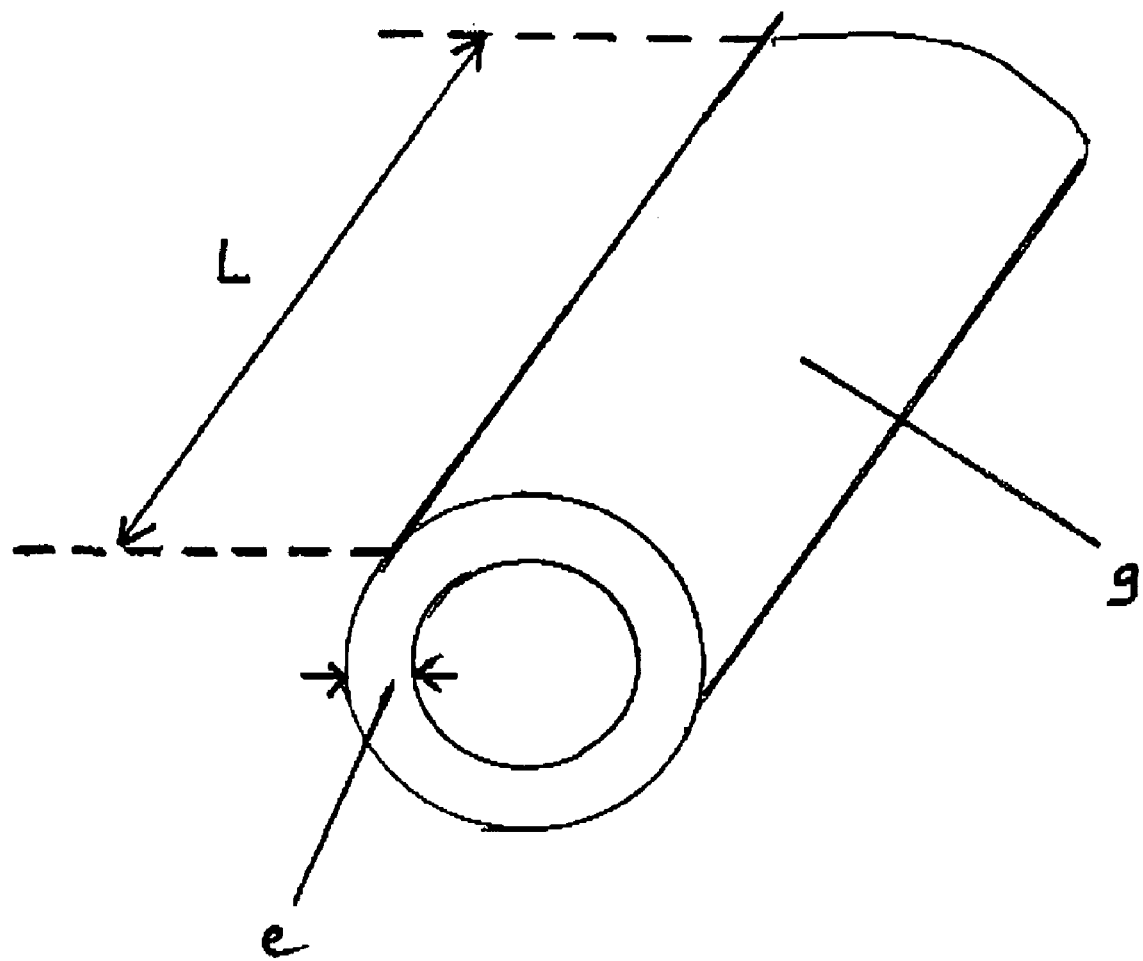
FIG. 9 depicts a perspective schematic view of circular cross section, with case (9) having length L and thickness e.

FIG. 8 depicts the variations in these two ratios for the two alloys 6060 and 6082. For the alloy of the 6060 series, the energy-mass ratio SEA 57 was between 14.13 and 12.61, while the energy-intrusion ratio SEI 57 was between 44.5 and 88.58. For the alloy of the 6082 series, the energy-mass ratio SEA 300 was between 17.32 and 14.35, while the energy-intrusion ratio SEI 300 was between 78.34 and 91.01.

In all cases, performance was optimized for a metal foam density of between 0.1 and 0.4 g/cm³, particularly between 0.1 and 0.3 g/cm³ (the value of 0.3 g/cm³ being excluded). Advantageously, the density of the metal foam was more or less equal to 0.25 g/cm³.

What is claimed is:

1. An energy-absorbin case (4) for a motor vehicle bumper beam (2) comprising a casing consisting of a hollow section piece which, when used with a bumper beam, has a first end attached to the bumper beam (2) and a second end fixed to the end of a longitudinal member (6) of the motor vehicle, wherein the casing is filled with a metal foam with energy-absorption properties having a density of between 0.1 and 0.4 g/cm³, wherein the hollow section piece has a square cross section with a side length (a) of between 50 mm and 80 mm, and wherein the hollow section piece has a rectangular or square cross section.

2. An energy-absorbing case (4) for a motor vehicle bumper beam (2) comprising a casing consisting of a hollow section piece which, when used with a bumper beam, has a first end attached to the bumper beam (2) and a second end fixed to the end of a longitudinal member (6) of the motor vehicle, wherein the casing is filled with a metal foam with enemy-absorption properties having a density of between 0.1 and 0.4 g/cm³, and wherein the length (L) of the hollow section piece is between 80 mm and 200 mm, wherein the length (L) of the hollow section piece is between 80 mm and 200 mm, and wherein the hollow section niece has a rectangular or square cross section.

3. An energy-absorbing case (4) for a motor vehicle bumper beam (2) comprising a casing consisting of a hollow section piece which, when used with a bumper beam has a first end attached to the bumper beam (2) and a second end fixed to the end of a longitudinal member (6) of the motor vehicle, wherein the casing is filled with a metal foam with energy-absorption properties having a density of between 0.1 and 0.4 g/cm³, and wherein the thickness (e) of the hollow section niece is between 1.5 mm and 3 mm, wherein the thickness (e) of the hollow section piece is between 1.5 mm and 3 mm, and wherein the hollow section piece has a rectangular or square cross section.

4. The energy-absorbing case as claimed in claim 3, wherein the hollow piece section has a square cross section, the thickness of the case is between 2.2 and 3 mm, and the length (L) of the hollow piece section is less than or equal to 80 mm.

5. The energy-absorbing case as claimed in claim 4, wherein the density of the foam is between 0.2 and 0.4 g/cm$^3$.

6. The energy-absorbing ease as claimed in claim 3, wherein the length of the hollow piece section is between 80 and 140 mm, and the density of the foam is between 0.1 and 0.3 cm$^3$.

7. The energy-absorbing case as claimed in claim 3, wherein the length of the hollow piece section is between 140 and 200 mm, and wherein it has an energy absorption mass ratio between 10 and 20.

8. An energy-absorbing case (4) for a motor vehicle bumper beam (2) comprising a casing consisting of a hollow section piece which, when used with a bumper beam, has a first end attached to the bumper beam (2) and a second end fixed to the end of a longitudinal member (6) of the motor vehicle, wherein the casing is filled with a metal foam with energy-absorption properties having a density of between 0.1 and 0.4 g/cm$^3$, wherein the density of the foam is between 0.1 and 0.3 g/cm$^3$, wherein the thickness (e) of the hollow section piece is between 1.5 mm and 3 mm and wherein the thickness (e) of the hollow section piece is between 1.5 mm and 3 mm.

9. The energy-absorbing case as claimed in claim 8, wherein the hollow section piece has a rectangular or square cross section.

10. The energy-absorbing case as claimed in claim 9, wherein the hollow piece section has a square cross section, the thickness of the case is between 2.2 and 3 mm, and the length (L) of the hollow piece section is less than or equal to 80 mm.

11. The energy-absorbing case as claimed in claim 9, wherein the length of the hollow piece section is between 80 and 140 mm, and the density of the foam is between 0.1 and 0.3 g/cm$^3$.

12. The energy-absorbing case as claimed in claim 9, wherein the length of the hollow piece section is between 140 and 200 mm, and wherein it has an energy absorption mass ratio between 10 and 20.

* * * * *